(12) United States Patent
Kolodner et al.

(10) Patent No.: US 7,525,722 B2
(45) Date of Patent: Apr. 28, 2009

(54) LIQUID MIRROR

(75) Inventors: Paul Robert Kolodner, Hoboken, NJ (US); Thomas Nikita Krupenkin, Warren, NJ (US); Oleksandr Sydorenko, Painted Post, NY (US); Joseph Ashley Taylor, Springfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 111 days.

(21) Appl. No.: 11/468,893

(22) Filed: Aug. 31, 2006

(65) Prior Publication Data
US 2008/0055711 A1 Mar. 6, 2008

(51) Int. Cl.
*G02B 26/00* (2006.01)
*G02B 7/182* (2006.01)

(52) U.S. Cl. ..................... 359/296; 359/846
(58) Field of Classification Search ............. 359/296, 359/846
See application file for complete search history.

(56) References Cited

U.S. PATENT DOCUMENTS

| | | | |
|---|---|---|---|
| 6,538,823 B2 | 3/2003 | Kroupenkine et al. | |
| 6,738,176 B2 * | 5/2004 | Rabinowitz et al. | 359/296 |
| 6,891,682 B2 | 5/2005 | Aizenberg et al. | |
| 6,936,196 B2 | 8/2005 | Chandross et al. | |
| 6,945,658 B2 * | 9/2005 | Borra et al. | 359/846 |
| 7,006,299 B2 | 2/2006 | Kroupenkine | |
| 2003/0227695 A1 | 12/2003 | Borra et al. | |
| 2004/0008430 A1 | 1/2004 | Borra et al. | |

FOREIGN PATENT DOCUMENTS

| | | | |
|---|---|---|---|
| WO | 2006046185 A1 | 5/2006 |
| WO | 2006054209 A1 | 5/2006 |
| WO | 2006075279 A1 | 7/2006 |

OTHER PUBLICATIONS

Bergamasco, P.R. Laird, et al.; "Ferrofluid Based Deformable Mirrors—A New Approach to Adaptive Optics Using Liquid Mirrors"; Proceedings of SPIE, vol. 4839, 2003; (XP-002366658); pp. 733-740.
Borra, Ermanno F., et al.: "Tiltable Liquid Mirror Telescopes"; Proceedings of SPIE, vol. 4003, 2000; (XP-009015487); pp. 331-336.
Written Opinion and Search Report for PCT/US2007/018813 dated Feb. 27, 2008(PCT related case); 13 pages.

* cited by examiner

*Primary Examiner*—William C Choi (57) ABSTRACT

An apparatus that comprises a liquid mirror. The liquid mirror includes a liquid that forms an interface with a fluid adjacent to the liquid. The liquid mirror also includes a layer of reflective particles located at the interface, wherein the layer forms a reflective surface.

16 Claims, 9 Drawing Sheets

LIQUID MIRROR

TECHNICAL FIELD OF THE INVENTION

The present invention is directed, in general, to mirrors, and more particularly, to a liquid mirror and method of using and manufacturing a liquid mirror.

BACKGROUND OF THE INVENTION

This section introduces aspects that may be helpful to facilitating a better understanding of the invention. Accordingly, the statements of this section are to be read in this light. The statements of this section are not to be understood as admissions about what is in the prior art or what is not in the prior art.

There are many optical applications where the use of reflective optics (e.g., mirrors) is preferred over the use of refractive optics (e.g., lenses). For instance, in optical devices ranging from telescopes to micro-electro-mechanical systems (MEMS), it is often important to make a device that is as compact as possible. Optical components using reflective optics can provide smaller focal distances and less signal losses than optical components using refractive optics, thereby allowing the miniaturization of optical devices. Another advantage is that the reflectivity of mirrors can be made insensitive to wavelength, reducing chromatic aberrations. In addition, mirrors can function in spectral regions where diffractive optics cannot, e.g., in the ultraviolet and in the infrared.

Some currently available optical components that use reflective optics have limited capabilities, however. This in turn, limits their scope of application, or limits the extent of device miniaturization. For example, certain MEMS have mirrors made of solid material. These solid mirrors have no or limited ability to change their curvature. Additionally, the mirrors in MEMS can deflect an incoming light beam over a limited range because the mirror has a limited range of rotation.

There are also situations where it is desirable to use both reflective and refractive optics in a complementary fashion. In such cases, it is advantageous if optical components using reflective and refractive optics can both be fabricated using similar manufacturing processes. However, the mirrors of conventional MEMS are often fabricated in a fashion that has no analogous process for the manufacture of lens. Therefore two different fabrication processes have to be used to create mirrors and lenses, thereby increasing the cost and complexity of constructing the MEMS.

Embodiments of the invention overcome these deficiencies by providing an apparatus that uses a liquid mirror and methods of manufacturing and use.

SUMMARY OF THE INVENTION

To address one or more of the above-discussed deficiencies, one embodiment is an apparatus. The apparatus comprises a liquid mirror. The liquid mirror includes a liquid that forms an interface with a fluid adjacent to the liquid. The liquid mirror also includes a layer of reflective particles located at the interface, wherein the layer forms a reflective surface.

Another embodiment is a method that comprises transmitting an optical signal using a liquid mirror. Transmitting the optical signal includes reflecting the optical signal off of a reflective surface of the liquid mirror. The reflective surface includes reflective particles located at an interface between a liquid of the liquid mirror and a fluid adjacent to the liquid.

Another embodiment is a method that comprises manufacturing a liquid mirror. The method of manufacturing the liquid mirror includes forming a layer of reflective particles at an interface between a liquid and a fluid. One side of the reflective particles has a hydrophilic surface and an opposite side of the reflective particles has a hydrophobic surface.

BRIEF DESCRIPTION OF THE DRAWINGS

The invention is best understood from the following detailed description, when read with the accompanying FIGURES. Various features may not be drawn to scale and may be arbitrarily increased or reduced in size for clarity of discussion. Reference is now made to the following descriptions taken in conjunction with the accompanying drawings, in which.

DETAILED DESCRIPTION

Embodiments of the invention benefit from the recognition that certain types of liquid mirrors have advantages over conventional solid mirrors. E.g., liquid mirrors of the invention can be configured to change their curvature in a tunable fashion, thereby providing a large dynamic range over which incoming light beam can be reflected. Additionally, certain liquid mirrors of the invention can be constructed using processes that are analogous to processes used to construct certain liquid lenses, thereby reducing the costs and complexity of fabricating of an optical apparatus that includes both liquid lenses and mirrors.

It is further recognized that several benefits are derived by using a liquid mirror that comprises a layer of reflective particles located at an interface between the liquid and a fluid (a gas or second liquid). A broad range of different types of reflective materials can be incorporated into the reflective particles. Consequently, the reflective particles can have a higher reflectivity and lower toxicity, as compared to reflective metals that are in a liquid state at room temperature (e.g., mercury) Moreover, by carefully choosing the composition of the particles, the layer of reflective particles can be configured to form a continuous reflective surface. Furthermore, changing the shape of the liquid can alter the shape of the reflective layer and these changes can be made dynamically, if desired.

One embodiment of the invention is an apparatus. In some cases, the apparatus can be a tunable light-processing device. In tunable devices, the direction of light reflected from the liquid mirror can be adjusted by applying a voltage to the liquid to change the shape of the reflecting surface of the mirror. Example devices include MEMS devices that are incorporated into image projectors, televisions, and computer or cell-phone displays. In other cases, however, the apparatus can be a passive light-processing device. In such devices, the direction of light reflecting from the liquid mirror is not altered by applying a voltage to change the shape of the reflecting surface. Example devices include vibration sensors or decorative mirrors.

Figure 1:
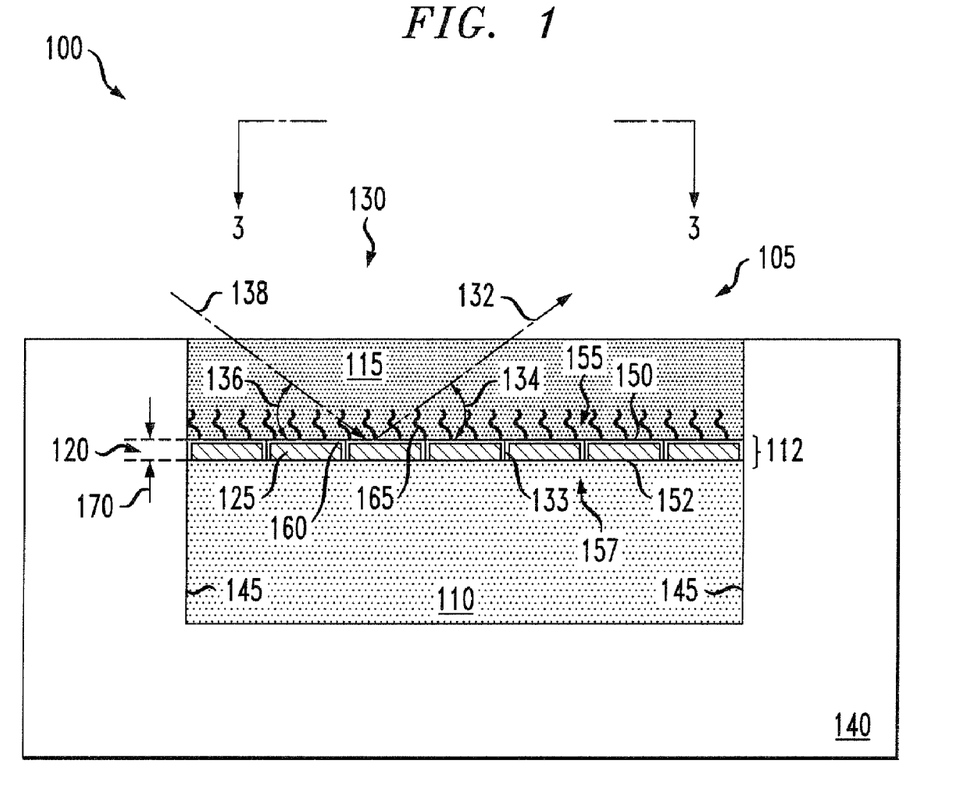
FIG. 1 presents a cross-sectional view of an example apparatus comprising the liquid mirror of the present invention.
Figure 2:
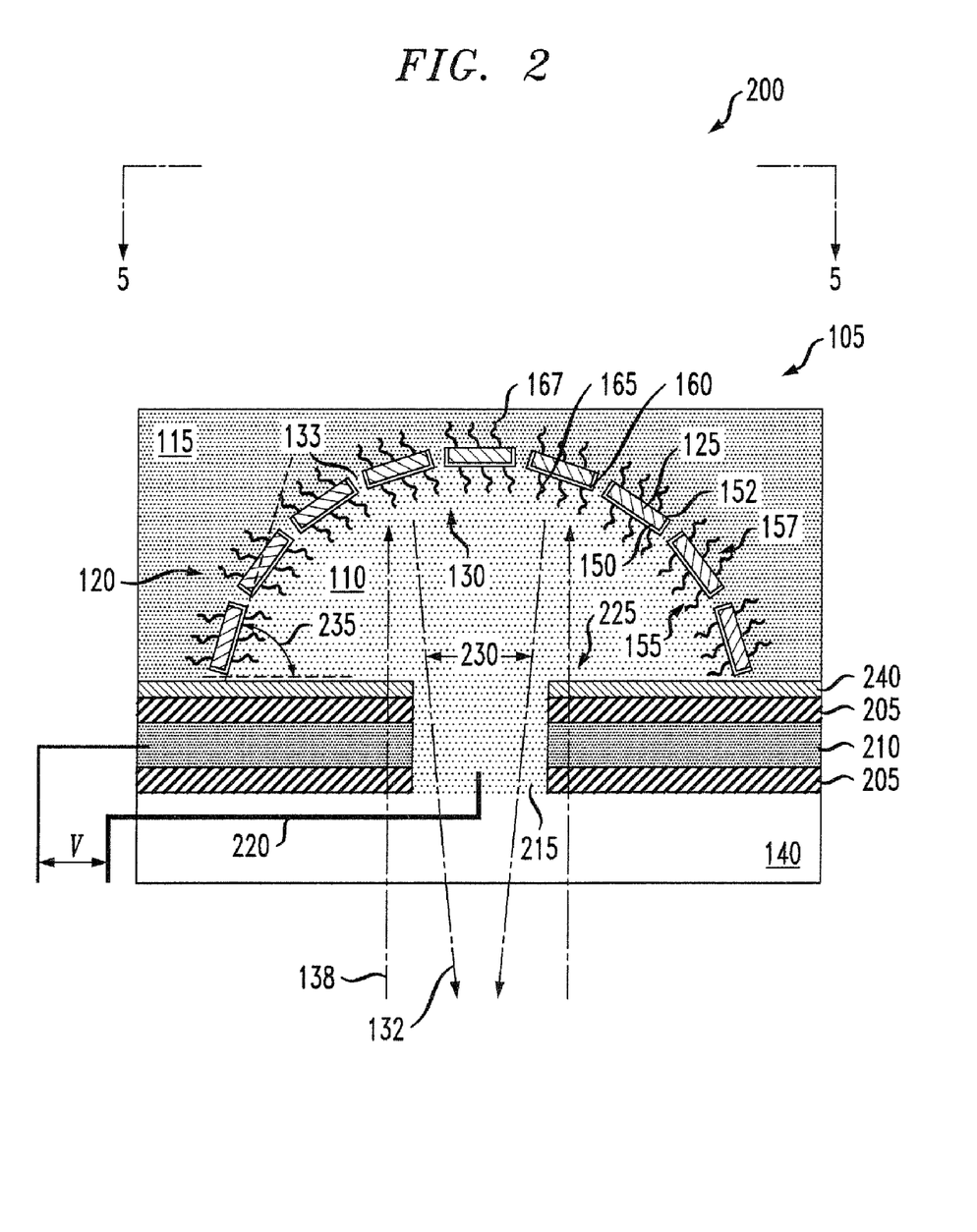
FIG. 2 presents a cross-sectional view of an second example apparatus comprising the liquid mirror of the present invention.

FIG. 1 presents a cross-sectional view of an example apparatus 100. FIG. 2 (using similar reference numbers as used in FIG. 1) presents a cross-sectional view of a second example apparatus 200. The apparatus 100 comprises a liquid mirror 105. The liquid mirror 105 includes a liquid 110 that forms an interface 112 with a fluid 115 adjacent to the liquid 110. The liquid mirror 105 also includes a layer 120 of reflective particles 125 located at the interface 112 between the liquid 110 and fluid 115. The layer 120 forms a reflective surface 130.

More preferably, the layer 120 forms a continuous reflective surface 130. The term continuous reflective surface, as used herein, means that the majority of light 132 reflected from the surface 130 is reflected, as opposed to being transmitted through gaps 133 between the reflective particles 125. Additionally, a reflective surface 130 is preferably locally smooth. That is, the light 132 that is reflected at an angle 134 by any particle 125 is substantially the same (e.g., within about 10 percent) as an angle 136 of the incident light 138 that was directed to the surface 130 at the particle's location.

To form the interface 112, it is desirable for the liquid 110 to be immiscible with the fluid 115. The fluid 115 comprises a gas or a second liquid. For instance, when the liquid 110 comprises a polar liquid such as water or ethanol, the fluid 115 can comprise a non-polar liquid or gas, such as an alkane or another hydrocarbon-based oil. The term polar liquid as used herein refers to a liquid having a dielectric constant of about 20 or greater (e.g., water and acetone have dielectric constants of about 80 and 21, respectively). The term non-polar liquid as used herein refers to a liquid that has a dielectric constant of less than about 5 (e.g., hexane and various hydrocarbon-based oils have dielectric constants of about 2 and about 2 to 5, respectively).

In some instances, it is preferable for the fluid 115 to comprise a second liquid rather than gas because it can protects the liquid 110 from evaporation. Having fluid 115 comprise a second liquid can also deter the undesired movement of the liquid 110 due to, e.g., movement or vibration of the apparatus 100. In such embodiments, it is advantageous for the fluid 115 to encapsulate all or a portion of the liquid 110.

It is also desirable for the liquid 110 to be one of a polar or non-polar liquid, and the fluid 115 to be the other of the polar or non-polar liquid or gas. For instance, when the liquid 110 comprises a polar liquid such as water, then the fluid 115 comprises a non-polar liquid or gas, such as alkanes, or air. Configuring the liquid 110 and fluid 115 to have different polarities from each other is advantageous because this facilitates the desired orientation of the reflective particles 125 at the interface 112.

Although it is preferable for the liquid 110 to comprise one of a polar or non-polar liquid, and the fluid 115 to comprise the other of a polar or non-polar liquid, in some cases the liquid 110 and fluid 115 can be of more general chemical compositions as long as they are immiscible and provide enough difference in their properties as to facilitate proper position and orientation of the particles 125 as described herein.

In some cases, it is desirable for one or both of the liquid 110 or fluid 115 to be transparent with respect to the light 132 that is reflected off of the reflective surface 130. This is desirable when the apparatus 100 is configured so that the light 132, 138 passes through the liquid 110 or the fluid 115, or both, before or after being reflected off of the reflective surface 130.

In some cases, it is advantageous for the liquid 110 to be electrically conductive. For instance, the liquid 110 can comprise a molten salts or aqueous or organic solutions of salts, such as described in U.S. Pat. Nos. 6,538,823; 6,891,682; and 6,936,196, all of which are incorporated by reference herein in their entirety. The use of an electrically conductive liquid 110 is desirable in embodiments where the liquid mirror 105 is configured to be tunable by applying a voltage to the liquid 110 to change the shape of the reflective surface 130.

In some instances, such as depicted in FIG. 1, the reflective surface 130 can be a planar surface. E.g., the liquid 110 can comprise a flat layer of liquid disposed on substrate 140, such as a planar substrate. In other instances, such as illustrated in FIG. 2, the reflective surface 130 can be a concave or convex surface. E.g., the liquid 110 can comprise a droplet disposed on the substrate 140. As shown in FIG. 2, when the reflective surface 130 faces the liquid droplet 110, then the reflective surface 130 is concave. In other cases, when the reflective surface faces the fluid, then the reflective surface is convex.

The liquid 110 need not comprise a droplet in order to have a concave or convex reflective surface 130, however. E.g., the substrate 140 can comprise sidewalls 145 to contain the liquid. The sidewalls 145 can be coated with hydrophobic or hydrophilic material to repel or attract the liquid 110 away from, or towards, the sidewalls 145, thereby making the surface convex or concave, respectively.

As shown in FIG. 1, the reflective particle 125 can comprise first and second sides 150, 152. The reflective surface 130 can either face the liquid 110 or the fluid 115, depending on the relative polarities of the liquid and fluid 115, and on how the sides 150, 152 of the reflective particles 125 are configured. The reflective particles 125 can include a first side 150 having a one of a hydrophilic surface 155 or a hydrophobic surface 157, and a second side 152 can have the other of the hydrophobic surface 155 or hydrophilic surface 157. The hydrophilic or hydrophilic surfaces 155, 157 can occupy all or a portion (e.g., about 10 to 90 percent) of each of the first and second sides 150, 152.

Configuring one of the sides 150, 152 with a hydrophobic surface 155 and the other side 150, 152 with a hydrophilic surface 157 facilitates the spontaneous uniform organization of the reflective particles 125 to form the continuous reflective surface 130 at the interface 112. That is, the side 150, 152 having the hydrophobic surface 155 will face the liquid 110 or fluid 115 that is non-polar. The side 150, 152 having the hydrophilic surface 157 will face the liquid 110 or fluid 115 that is polar.

As illustrated in FIG. 1, if the first side 150 is configured to have the hydrophobic surface 155, then the first side 150 would face the liquid 110 that comprises a non-polar liquid. The second side 152, having the hydrophilic surface 157, faces the fluid 115 that comprises a polar second liquid or gas. Of course, if the first side 150 were configured to have the hydrophobic surface 155, then it would face the non-polar fluid 115. Or, if the liquid 110 and fluid 115 were non-polar and polar liquids, respectively, then a first side 150 having a hydrophilic surface 157 would face the fluid 115. One skilled in the art would appreciate how various combinations of polar and non-polar liquids 110 and fluids 115 and hydrophobic and hydrophilic surfaces 155, 157 can be arranged to orient the sides 150, 152 of the particle 125 as desired.

Some embodiments of the reflective particles 125 comprise a reflective coating 160. The reflective coating 160 can be on one or both sides 150, 152 of each particle 125. In some cases, the reflective coating 160 comprises a solid metal such as gold or silver, aluminum or an alloy thereof. E.g., the reflective coating can comprise a reflective coating gold bonded to a silicon particle 125 using an adhesive material such as chromium to facilitate bonding of the gold to silicon. In other cases, the reflective coating 160 comprises a multilayered dielectric. E.g., the reflective coating 160 can comprises a plurality of layers composed of at least two materials having substantially different refractive indices (e.g., silicon oxide and silicon nitride layers). In still other cases, however, reflective particles 125 itself comprises a solid metal such as gold or silver, aluminum or an alloy thereof, thereby eliminating the need for a reflective coating.

The reflective coating 160 can be oriented towards the liquid 110 or fluid 115, as desired, by forming hydrophobic or hydrophilic surfaces 155, 157 on it. In some preferred embodiments, a first side 150 of each particle 125 is covered with a metal, or a multilayered dielectric, reflective coating 160 to which is bonded to one of hydrophobic or hydrophilic molecules 165. The term hydrophobic molecule as used herein refers to a molecule that would be soluble in a non-polar liquid but not a polar liquid. The term hydrophilic molecule refers to a molecule that is soluble in a polar liquid but not a non-polar liquid.

It is advantageous for the hydrophobic or hydrophilic molecules 165 to be selected so that they form a self-assembling monolayer (SAM) because this facilitates the formation of a uniform hydrophobic or hydrophilic surface 155, 157 on the reflective coating 160. For instance, hydrophobic molecules 165 can comprise an unsubstituted hydrocarbon chain (e.g., an alkane chain) having from about 6 to 20 Carbon atoms. Hydrophilic molecules 165 can comprise similar hydrocarbon chains, but end-substituted with polar groups such as hydroxyl (—OH) groups. One skilled in the art would appreciate that various other types of hydrophilic or hydrophobic molecules 165 could be selected for their ability to form a SAM.

To facilitate bonding to the reflective coating 160, one end of the hydrophobic or hydrophilic molecule 165 can be terminated with functional groups that are capable of forming covalent bonds to the material of the reflective coating. For instance, when the reflective coating 160 comprises metal, the unsubstituted or substituted hydrocarbon chain can be terminated with thiol groups (—SH). E.g., there can be e.g., one to three thiol groups in the n-position carbon of the hydrocarbon chain of the hydrophobic or hydrophilic molecules 165. When the reflective coating 160 comprises a multilayer dielectric (e.g., silicon oxide and silicon nitride layers), the unsubstituted or substituted hydrocarbon chain can be terminated with chloro groups (—Cl). E.g., there can be one to three chloro groups in the n-position carbon of the hydrocarbon chain hydrophobic or hydrophilic molecules 165. The use of various other types of functional groups to facilitate bonding would be readily apparent to one skilled in the art.

As illustrated in FIG. 1, the second side 152, which is not covered with the reflective coating, can comprise silicon oxide (e.g., such as when the particle 125 is comprises silicon), which can be the hydrophilic surface 157 (e.g., FIG. 1). Alternatively, as shown in FIG. 2, the side 152 that is not covered with the reflective coating can also have hydrophobic or hydrophilic molecules 167 bonded to it. E.g., hydrophilic molecules 165 can be bound to the covered side 150 that faces a polar liquid 110, while hydrophobic molecules 167 can be bound to the uncovered side 152 that faces a non-polar fluid 115.

As part of the present invention, it was recognized for the first time that the size and shape of the reflective particles 125 are important, and in some cases critical, determinants of the properties of the continuous reflective surface 130.

Figure 3:
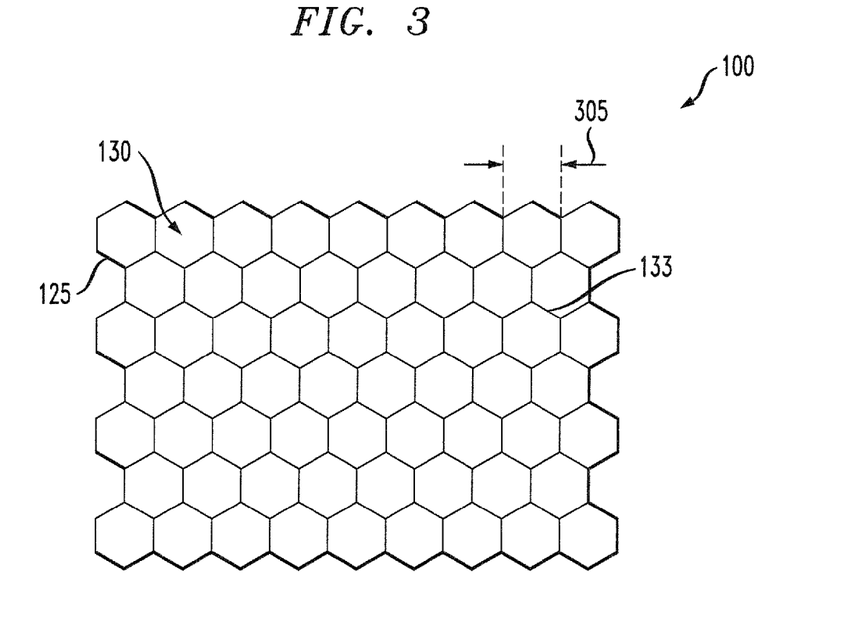
FIG. 3 shows a plan view the liquid mirror presented in FIG. 1.

FIG. 3 (using similar reference numbers) presents a plan view, corresponding to view line 3-3 in FIG. 1, of a portion of the reflective surface 130. In some preferred embodiments, the reflective particles 125 are colloidal particles in the liquid 110 or fluid 115. Colloidal reflective particles 125 are preferred because the effects of gravity on such particles 125 when in the liquid 110 are negligibly small, thereby permitting the particles 125 to assemble at the interface 112 (FIG. 1). In some cases, the particles 125 have a diameter 305 ranging from about 100 nanometers to 100 microns, and a thickness 170 (FIG. 1) ranging from about 10 nanometers to 1 micron. In some preferred embodiments, the particles 125 having a diameter 305 ranging from about 200 nanometers to 300 nanometers, and a thickness 160 ranging from about 20 nanometers to 30 nanometers.

In some embodiments it is advantageous the reflective particles 125 to be small compared to the wavelength of light to be directed to the reflective surface 130, so that the light reflected off of the surface 130 is not affected (e.g., due to light scattering) by the individual particles 125. E.g., in some cases, the particles 125 have a diameter 305 ranging from about 10 to 50 percent of the wavelength of light to be directed to the reflective surface 130. E.g., in the case where visible light is used, the diameter 305 preferably ranges from about 40 nanometers to 200 nanometers. E.g., in the case where infrared light is used, the diameter 305 preferably ranges from about 100 nanometers to about 50 microns.

It is also important for each reflective particle 125 to have a shape that is conducive to forming a continuous surface 130 with small or no gaps 133 between individual particles. As shown in FIG. 3, in some preferred embodiments, each of the reflective particles 125 have a flat hexagonal shape because this shape minimizes geometrical frustration between particles 125, thereby reducing the size of the gaps 133 between the particles 125.

FIG. 2 shows additional aspects of a preferred embodiment of the apparatus 200, when the liquid mirror 105 is configured as a tunable liquid mirror. In such embodiments the liquid 110 is electrically conductive. The apparatus 200 further comprises an insulating layer 205 on the substrate 140 and a plurality of electrodes 210 insulated from the liquid 110 by the insulating layer 205. In some cases, the insulating layer 205 can include an opening 215 to allow the liquid 110 to contact a biasing electrode 220 that is in contact with the liquid 110.

As further illustrated in FIG. 2, the substrate 140 can comprise the biasing electrode 220. It some cases, it is desirable for the biasing electrode 220 to not contact the reflective particles 125, because this would disturb the formation of the continuous reflective surface 130. In other preferred embodiments, the substrate 140 itself is electrically conductive and therefore can serve as the biasing electrode. This advantageously avoids the need to construct a separate biasing electrode in the substrate 140.

As shown in FIG. 2, the liquid 110 is disposed over a surface 225 of the insulating layer 205. As illustrated, the substrate 140 and insulating layer 205 can both be substantially planar. The plurality of electrodes 210 are configured to adjust the liquid's shape (e.g., a lateral position 230 or a contact angle 235 of the liquid 110 relative to the surface 225) when a voltage (V) is applied between the liquid 110 (e.g., via biasing electrode 220) and one or more of the electrodes 210.

In some embodiments, it is desirable for the liquid 110, the insulating layer 205, the substrate 140 and the electrodes 210 to be transparent with respect to the light 138 to be reflected off of the liquid mirror 105. This can be desirable in situations such as shown in FIG. 2, when the liquid 110 is a droplet that forms a concave reflective surface 130 with the reflective coating 160 facing the liquid 110. For example, the transparent liquid 110 can comprise water, the transparent insulating layer 205 can comprise a polyimide, the transparent conductive substrate 140 can comprise glass, silicon dioxie, quartz, sapphire, diamond or other transparent solid materials and the transparent electrodes 210 can comprise indium tin oxide.

In some cases, the insulating layer's surface 225 is covered with a coating of low-surface-energy material 240. The coating 240 serves to adjust the contact angle 235 of the liquid 110 to a predefined value (e.g., from about 80 to 100 degrees in some embodiments). Adjusting the contact angle 235 advantageously modifies the reflective properties (e.g., focal length or angle of reflection) of the liquid mirror. The term low-surface-energy material, as used herein, refers to a material having a surface energy of about 22 dyne/cm (about $22 \times 10^{-5}$ N/cm) or less. Those of ordinary skill in the art would be familiar with the methods to measure the surface energy of materials. In some instances, the coating 240 comprises a fluorinated polymer like polytetrafluoroethylene or other highly fluorinated hydrocarbon, or an alkylsilane like polydimethylsilane. In some instances, the insulating layer 205 and low surface energy coating 240 comprise a single material, such as Cytop® (Asahi Glass Company, Limited Corp. Tokyo, Japan), a fluoropolymer that is both an electrical insulator and a low-surface-energy material.

Figure 4:
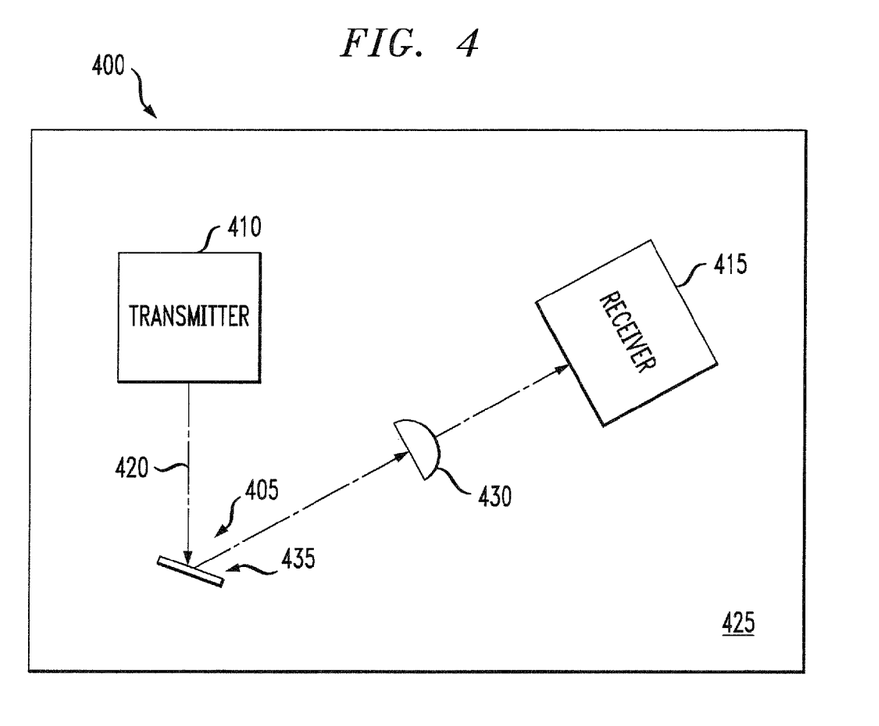
FIG. 4 presents a plan view of an third example apparatus comprising the liquid mirror of the present invention.

FIG. 4 shows a plan view of another preferred embodiment of the apparatus 400 configured as an optoelectronic device that comprises one or more liquid mirror 405. The liquid mirror 405 can comprise any of the embodiments of liquid mirrors discussed above in the context of FIGS. 1-3. As illustrated in FIG. 4 the apparatus 400 includes a transmitter 410 (e.g., a laser or lamp) and a receiver 415 (e.g., a photodetector or camera). The transmitter provides an optical signal 420 which is received by the receiver 415. The liquid mirror 405 is configured to reflect the optical signal 420 from the transmitter 410 to the receiver 415. The mirror 405, transmitter 410, and receiver 415 can be mounted on a substrate 425 (e.g., a printed circuit board).

The liquid mirror 405 can be configured to alter the optical signal 420 in any number of ways familiar to those skilled in the art. E.g., the liquid mirror 405 can alter the direction of the optical signal 420 by reflecting the signal 420 or optionally focus the optical signal 420. When the liquid mirror 405 is configured as a tunable liquid mirror, the shape or position of the liquid can be adjusted the to improved the optical coupling between components of the apparatus 400.

As further illustrated in FIG. 4, the apparatus 400 can further include a liquid lens 430, such as described in U.S. Pat. No. 6,538,823. E.g., the optical signal 420 reflected from the liquid mirror 405 can be directed to the liquid lens 430, which then focuses the optical signal 420 before it reaches the receiver 415. One skilled in the art would appreciate the variety of ways that the liquid mirror 405 and liquid lens 430 could be arranged in optoelectronic devices. Having both tunable liquid mirrors 405 and liquid lenses 430 in the same apparatus 400 also advantageously allows the optical signal 420 to be adjusted and optimized over greater ranges of distances and focal lengths.

Another aspect of the invention is a method of use that comprises transmitting an optical signal using a liquid mirror. Any of the liquid mirrors described in the context of FIGS. 1-4 can be used in the method. For instance, as illustrated in FIG. 4, transmitting the optical signal 420 includes reflecting the optical signal 420 off of a reflective surface 435 of the liquid mirror 405.

In some cases, such as illustrated in FIG. 2, the liquid 110, the fluid 115 or both are transparent and the optical signal (e.g., light 138) travels through the liquid 110 to the reflective surface 130. As further illustrated in FIG. 2, the liquid 110 can be configured as a droplet, thereby configuring the reflective surface 130 as a concave interior surface of the liquid droplet 110. In such instances, reflecting an optical signal of incident light 132 off of the reflective surface 130 includes focusing the beams of light. For illustrative purposes in FIG. 2, the light 138 is shown passing through the liquid 110 and reflecting off a concave reflective surface 130. However, the mirror 105 could use light 132 reflected from either concave or convex surfaces of the particles 125, or both surfaces at once. In still other cases, such as shown in FIG. 1, the liquid 110 can be disposed on a planar substrate 140, thereby configuring the reflective surface 130 as a planar reflective surface. In such instances, reflecting an optical signal of parallel beams of incident light 132 off of the reflective surface 130 includes retaining the incidents light 138 as parallel beams of light.

The some preferred embodiments, transmitting the optical signal further includes tuning the liquid mirror by changing the shape of the liquid. For instance, as illustrated in FIG. 2, tuning the mirror 105 can include applying a voltage (V) between the electrically conductive liquid 110 and one or more of the plurality of electrodes 210 insulated from the liquid 110, to thereby adjust one or both of a lateral position of the liquid or a contact angle of the liquid 110. The voltage (V) can be formed by selectively biasing the electrodes 210 with respect to a biasing electrode 220 (or a electrically conductive substrate 140) in contact with the liquid 110.

Tuning the liquid 105 is not limited to tuning a liquid droplet, however. E.g., the reflective surface 130 can be configured as a planar reflective surface, such as illustrated in FIG. 1. The apparatus 100 can include a 2-dimensional array of electrodes 210 arranged under the liquid 110, the fluid 115 and the reflective surface 130 similar to that depicted in FIG. 2. By appropriately activating selected electrodes 210, the shape of the planar surface 130 can be made locally non-planar. That is, there are local changes in the shape of the liquid 110, which can be characterized by local changes in the liquid's 110 lateral position or contact angle, analogous to that discussed above in the context of the liquid droplet shown in FIG. 2. Distortions caused by this non-planar surface 130 can be tuned so as to compensate aberrations in the incident light 138. This could provide a simple alternative to, e.g., maskless lithography based on solid MEMS mirrors or other methods of adaptive optical wavefront compensation.

Figure 5:
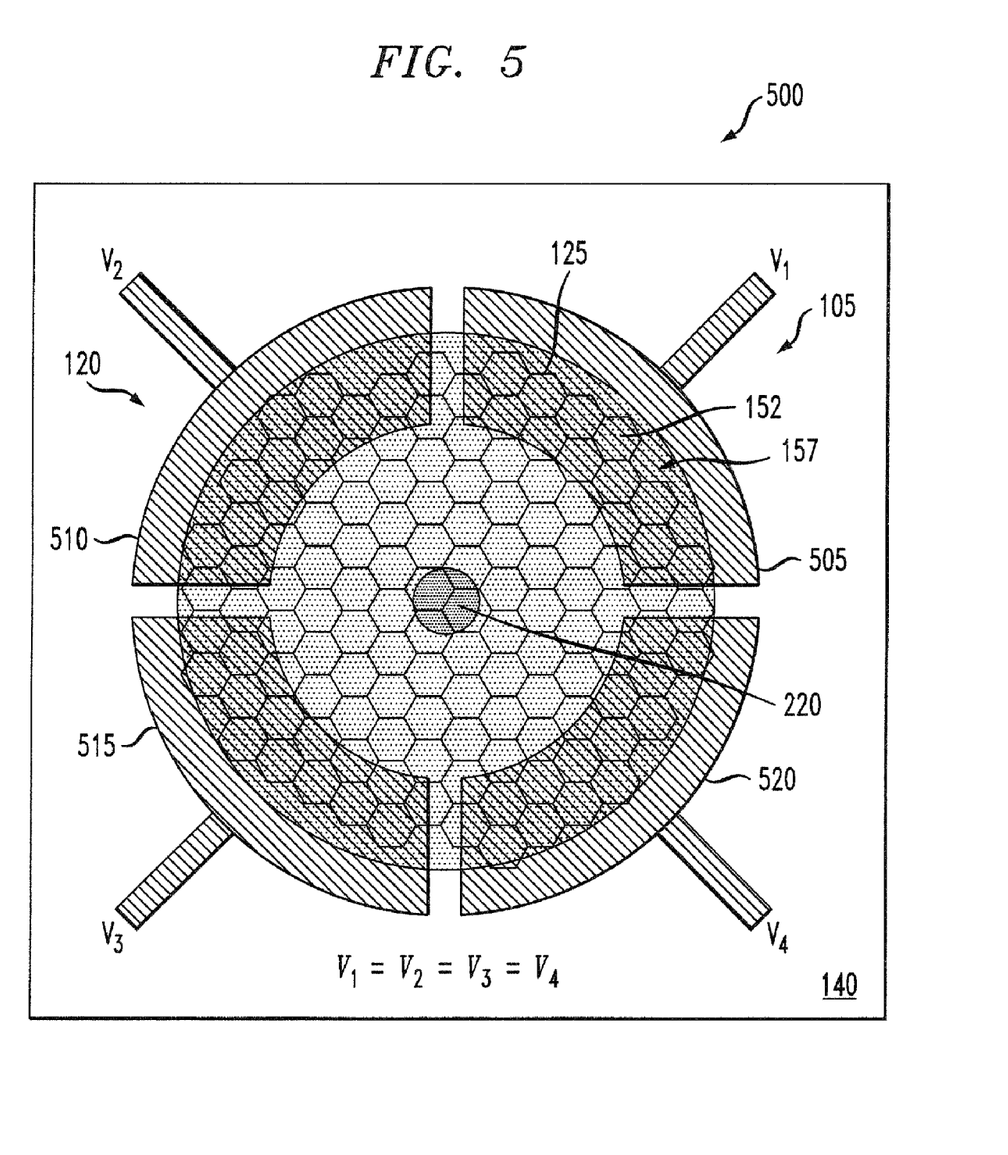
FIGS. 5-6 present plan views of the liquid mirror depicted in FIG. 2 at different stages of use.
Figure 6:
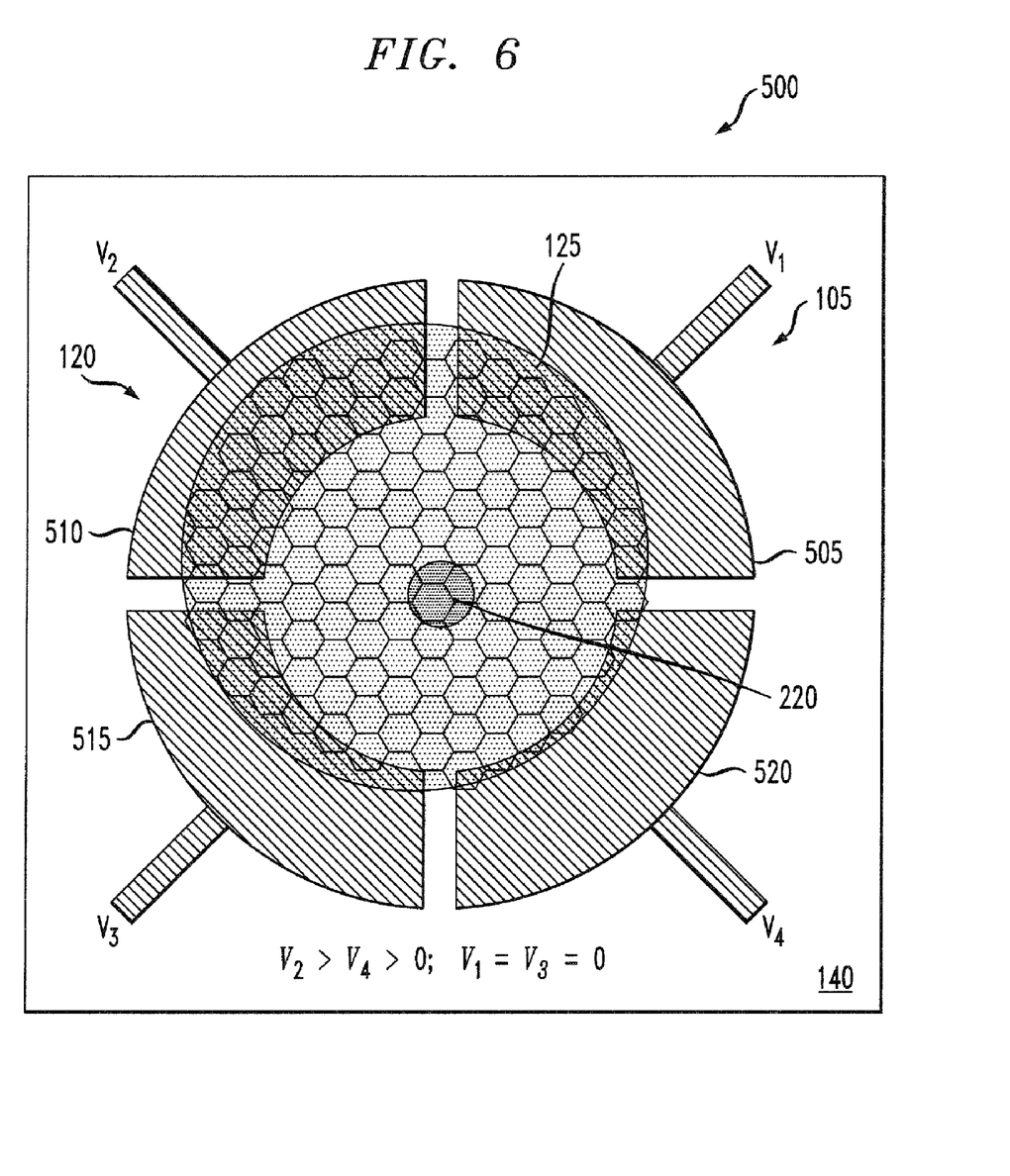

An example tunable liquid mirror 500 at different stages of use is illustrated in FIGS. 5 and 6, which show a semi-transparent plan views of a portion of the apparatus 200 depicted in FIG. 2 along view line 5-5. For clarity, certain features such as the hydrophobic molecules 167 and the overlying fluid 115 are not shown. When voltages $V_1$, $V_2$, $V_3$, $V_4$ applied to each the electrodes 505, 510, 515, 520 (analogous to the electrodes 210 depicted in FIG. 2) are all equal to each other (e.g., $V_1=0$, $V_2=0$, $V_3=0$, $V_4=0$), then the layer of reflective particles 120 is located centrally between the electrodes 505, 510, 515, 520. As shown in FIG. 6, the layer of reflective particles 120 will move towards the electrode 510 whose biased voltage is made greater than zero Volts and greater than a diagonally positioned electrode 520 (e.g., $V_2 > V_4 > 0$), and the remaining two electrodes 505, 515 have zero voltage (e.g., $V_1 = V_3 = 0$).

In other embodiments, however, the liquid mirror 105 can be used without the need for tuning. For example, the apparatus 200 can be configured as a vibration detector. When the reflective surface 130 of the liquid mirror 105 is disturbed by vibrations (e.g., due to movement of the apparatus 200 or movement in the vicinity of the apparatus 200) the light 132 reflected off the mirror 105 is altered in intensity or direction. Alterations in the light 132 can be detected thereby providing a means to detect vibrations.

Yet another aspect of the invention is a method that comprises manufacturing a liquid mirror. The method to manufacture the liquid mirror could be part of a process to manufacture any of the example apparatuses described in the context of FIGS. 1-6. FIGS. 7-15 show cross sectional views of selected steps in an example method of manufacturing a liquid mirror 700.

Figure 7:
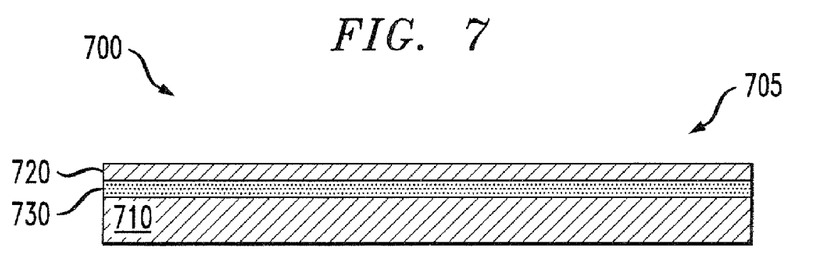
FIGS. 7-15 show cross sectional views of selected steps in an example method of manufacturing a liquid mirror.
Figure 8:
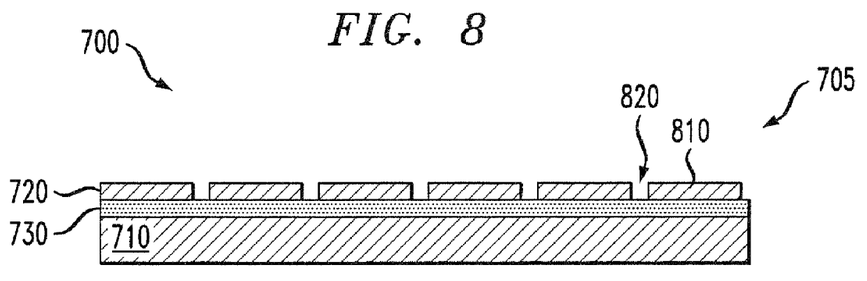

FIGS. 7-12 show selected steps in a method to form reflective particles 705 of the liquid mirror 700. The method includes providing a substrate 710 (e.g., a silicon-on-insulator substrate) having a silicon layer 720 on a silicon oxide layer 730 (FIG. 7). FIG. 8 depicts the substrate 710 after patterning the silicon layer 720 to form isolated regions. E.g., using conventional photolithography procedures can be used to form trenches 820 in the silicon layer 720, with the silicon oxide layer 730 serving as an etch stop layer. In some preferred embodiments, the isolated regions of silicon 810 are patterned to have a hexagonal shape, such as depicted in FIG. 3. However, other types of shapes (e.g., circles or squares) could be alternatively or additionally patterned.

Figure 9:
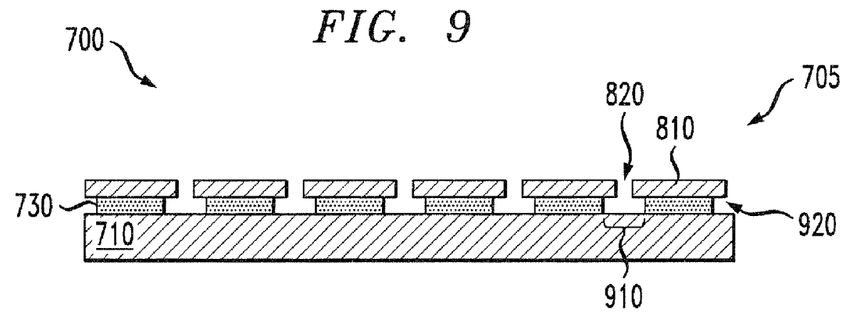

FIG. 9 shows the substrate 710 after partially removing portions 910 of the silicon oxide layer 730 located between the isolated regions 810. As depicted in FIG. 9, the removed portions 910 can extend underneath the isolated regions of silicon 810. E.g., the substrate 710 could be submerged in a hydrofluoric acid bath for a predefined period. During etching period, the hydrofluoric acid will etch portions of the silicon oxide layer 730 that were exposed by the trenches 820, and then further etch the silicon oxide 730 lying under the isolated regions 810 so that the isolated regions form undercut regions 920 for each of the isolated regions 810. The substrate 710 is taken out of the hydrofluoric acid bath and rinsed with water before the silicon oxide layer 730 is entirely removed.

Figure 10:
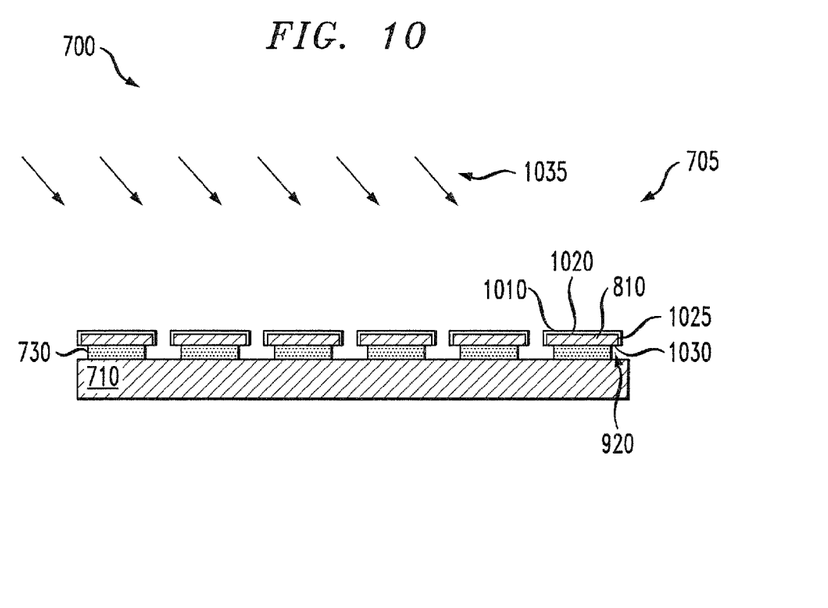

FIG. 10 shows the substrate 710 after forming a reflective coating 1010 on one side 1020, and in some cases the sidewalls 1025, of the isolated regions 810. Preferably, the deposition process selected so that an opposite side 1030 of the isolated regions 810 exposed by the undercut regions 920, is not covered with the reflective coating 1010, and therefore is an uncoated side 1030. E.g., physical vapor deposition (PVD) processes (e.g., sputtering) can be used to deposit a reflective material 1035 (e.g., metal or a multi-layered dielectric) onto the one side 1020 of the isolated regions 810. In some cases, it is desirable to first deposit an adhesive coating (e.g., PVD deposited chromium) on the side 1020 to promote adhesion of the reflective coating 1010 (e.g., gold or aluminum) to isolated regions of silicon 810.

Figure 11:
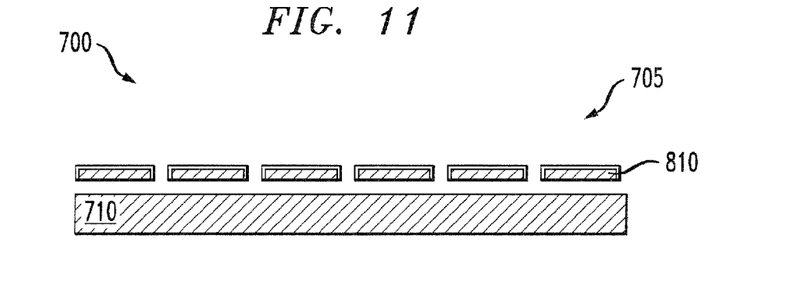

FIG. 11 shows the substrate 710 after releasing the isolated regions 810 from the substrate 710 to form the reflective particles 705. E.g., the substrate 710 can be submerged in a hydrofluoric acid bath for a period sufficient to complete the undercutting of the isolated regions 810 by entirely removing the silicon oxide layer 730 (FIG. 10), and thereby release the isolated regions 810 for the substrate 710.

Figure 12:
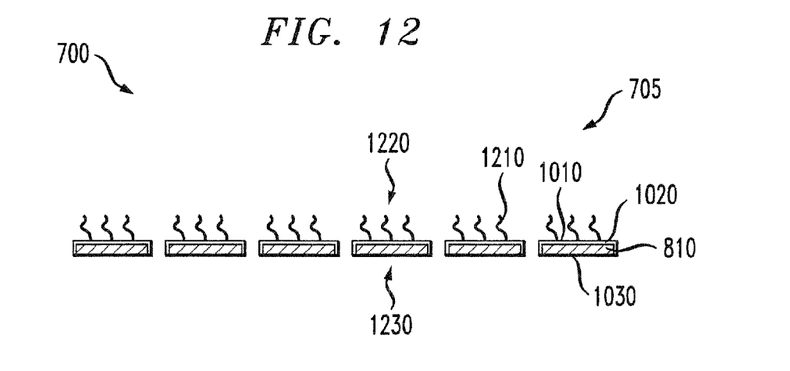

FIG. 12 shows the reflective particles 705 after attaching one of hydrophobic or hydrophilic molecules 1210 to the side 1020 having the reflective coating 1010, thereby providing one of a hydrophobic or hydrophilic surface 1220, respectively. The uncoated side 1030 preferably has the other of a hydrophobic or hydrophilic surface 1230. That is, the other of hydrophobic or hydrophilic molecules can be attached to the uncoated side 1030. E.g., if hydrophilic molecules are attached to the side 1020 with the reflective coating 1010 then hydrophobic molecules can be attached to the uncoated side 1030. Alternatively, as illustrated in FIG. 12, the uncoated side 1030 can remain free of the hydrophobic or hydrophilic molecules. E.g., hydrophobic molecules 1210 comprising self-assembling molecules of a thio-terminated alkane chain can be attached to the side 1020, while the uncoated side 1030 of silicon provides a hydrophilic surface 1230.

Figure 13:
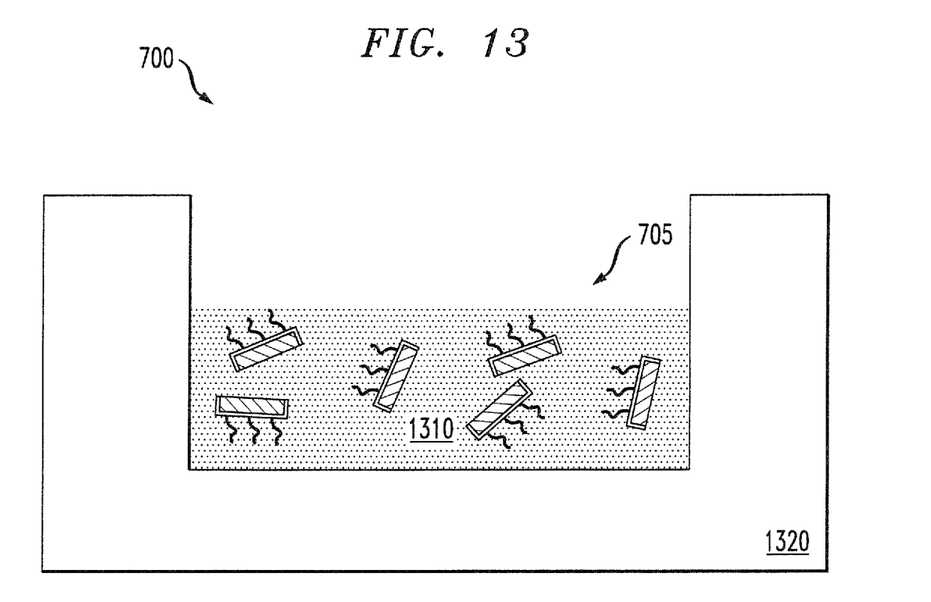

FIG. 13 shows the liquid mirror 705 after adding the reflective particles 705 to a liquid 1310 contained in a second substrate 1320 to form a colloidal suspension. As discussed in the context of FIG. 1, the reflective particles 705 are constructed to have a size that is conducive to forming a colloidal suspension of particles 705 in the liquid 1310.

Figure 14:
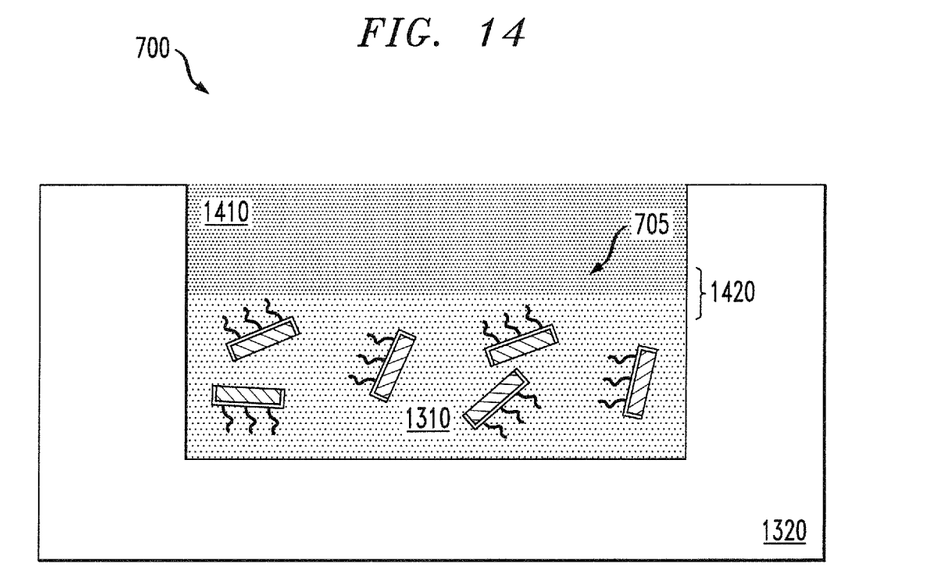

FIG. 14 shows the liquid mirror 705 after placing a fluid 1410 over the liquid 1310. An interface 1420 forms between the liquid 1310 and the fluid 1410 because the liquid 1310 is immiscible with the fluid 1410. As also discussed in the context of FIG. 1, the liquid 1310 and fluid 1410 are selected such as that the liquid is one or a polar or non-polar liquid and the fluid is the other of the polar or non-polar liquid or gas. In alternative embodiments, the reflective particles 705 can be added to the fluid 1410 to form a colloidal suspension of particles 705 in the fluid 1410, and then the fluid 1410 is placed over the liquid 1310. As discussed above in the context of FIG. 1, the selection of the liquid 1310 and fluid 1410, and the formation of hydrophobic and hydrophilic surfaces 1220, 1230 on opposite sides 1020, 1030 of the reflective particles 705 are all important factors to forming a continuous reflective surface of the mirror 705.

Figure 15:
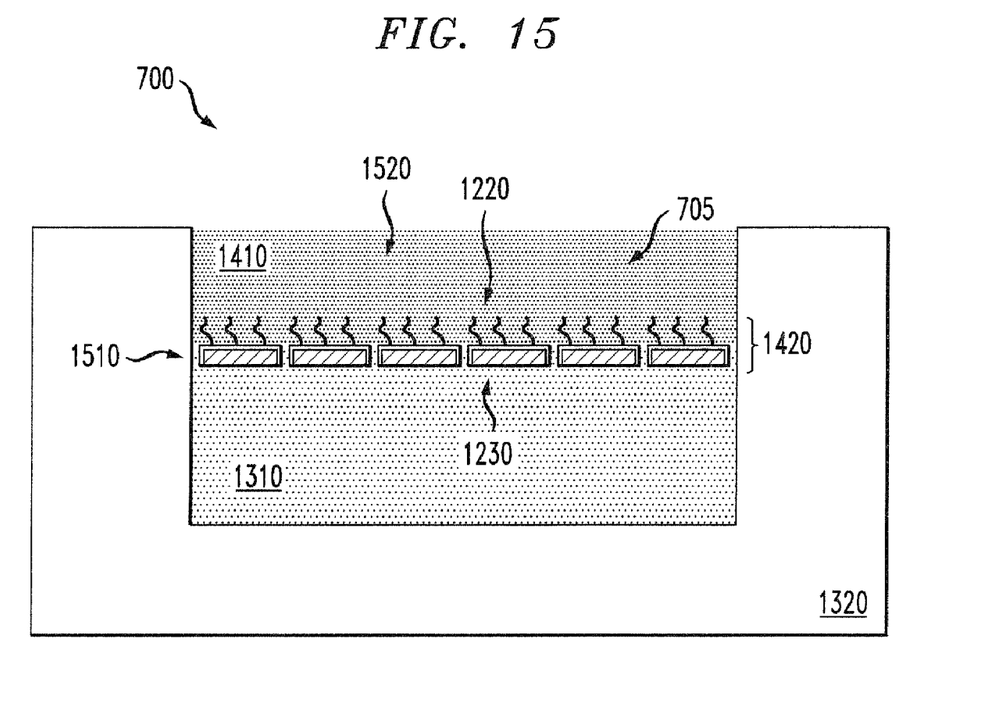

FIG. 15 shows the liquid mirror 705 after the reflective particles 705 have assembled at the interface 1420 between the liquid 1310 and the fluid 1410 to form a layer 1510 of reflective particles 705 at the interface 1420. Preferably, the reflective particles 705 spontaneously arrange themselves such that the hydrophobic surface 1220 faces the liquid 1310 or fluid 1410 that is non-polar, while the hydrophilic surface 1230 faces the liquid 1310 or fluid 1410 that is polar. As a result, the layer 1510 of reflective particles 705 assemble to form a reflective surface 1520, and more preferably, a continuous reflective surface.

Although the present invention has been described in detail, those of ordinary skill in the art should understand that they can make various changes, substitutions and alterations herein without departing from the scope of the invention.

What is claimed is:

1. An apparatus, comprising:
    a liquid mirror including:
        a liquid that forms an interface with a fluid adjacent to said liquid; and
        a layer of reflective particles located at said interface, wherein said layer forms a reflective surface wherein each of said reflective particles includes a first side having one of a hydrophilic or hydrophobic surface and a second side having the other of said hydrophilic or said hydrophobic surface.

2. The apparatus of claim 1, wherein said reflective surface is a continuous reflective surface.

3. The apparatus of claim 1, wherein said liquid is immiscible in said fluid and said liquid is one of a polar or non-polar liquid and said fluid is the other of said polar or non-polar liquid or gas.

4. An apparatus, comprising:
    a liquid mirror including:
        a liquid that forms an interface with a fluid adjacent to said liquid; and a layer of reflective particles located at said interface, wherein said layer forms a reflective surface wherein each of said reflective particles includes:

a first reflective side having a hydrophobic surface, wherein said first reflective side faces said liquid that comprises a non-polar liquid or a gas; and a second side having a hydrophilic surface wherein said second side faces said fluid that comprises a polar liquid.

5. An apparatus, comprising:

a liquid mirror including:

a liquid that forms an interface with a fluid adjacent to said liquid; and a layer of reflective particles located at said interface, wherein said layer forms a reflective surface wherein each of said reflective particles include:

a first reflective side having a hydrophilic surface, wherein said first reflective side faces said liquid that comprises a polar liquid; and a second side having a hydrophobic surface wherein said second side faces said fluid that comprises a non-polar liquid or a gas.

6. An apparatus, comprising:

a liquid mirror including:

a liquid that forms an interface with a fluid adjacent to said liquid; and a layer of reflective particles located at said interface, wherein said layer forms a reflective surface wherein said reflective particles include:

a first side covered with a reflective coating, wherein one of hydrophobic molecules or hydrophilic molecules are bonded to said reflective coating; and a second side not covered with said reflective coating.

7. An apparatus, comprising:

a liquid mirror including:

a liquid that forms an interface with a fluid adjacent to said liquid; and a layer of reflective particles located at said interface, wherein said layer forms a reflective surface wherein each of said reflective particles are colloidal particles having a size ranging from about 100 nanometers to 100 microns and a thickness ranging from about 10 nanometers to 1 micron and each of said reflective particles having a hexagonal shape.

8. An apparatus, comprising:

a liquid mirror including:

a liquid that forms an interface with a fluid adjacent to said liquid; and a layer of reflective particles located at said interface, wherein said layer forms a reflective surface;

an insulating layer on a substrate; and a plurality of electrodes insulated from said liquid by said insulating layer, wherein said substrate comprises a biasing electrode that is in contact with said liquid;

said liquid is electrically conductive and is disposed over a surface of said insulating layer, and said plurality of electrodes are configured to adjust a lateral position or a contact angle of said liquid relative to said surface when a voltage is applied between said biasing electrode and one or more of said electrodes.

9. The apparatus of claim 8 wherein said liquid mirror is configured as a tunable liquid mirror.

10. The apparatus of claim 8 wherein said apparatus is configured as an optoelectronic device further including:

a transmitter, said transmitter providing an optical signal; and a receiver, said receiver receiving said optical signal; and wherein said liquid mirror is configured to direct said optical signal from said transmitter to said receiver.

11. A method, comprising:

transmitting an optical signal using a liquid mirror, including:

reflecting said optical signal off of a reflective surface of said liquid mirror, said reflective surface including reflective particles located at an interface between a liquid of said liquid mirror and a fluid adjacent said liquid, wherein said liquid is configured as a droplet, thereby configuring said reflective surface as a concave interior reflective surface of said droplet.

12. The method of claim 11, wherein said liquid is transparent and said optical signal travels through said liquid to said reflective surface.

13. A method, comprising:

manufacturing a liquid mirror including:

forming a layer of reflective particles at an interface between a liquid and a fluid, wherein one side of said reflective particles has a hydrophilic surface and an opposite side of said reflective particles has a hydrophobic surface.

14. The method of claim 13, wherein forming said layer of reflective particles comprises adding said reflective particles to said liquid to form a colloidal suspension and locating said fluid over said liquid.

15. The method of claim 13, wherein forming said layer of reflective particles comprises adding said reflective particles to said fluid to form a colloidal suspension and locating said fluid over said liquid.

16. The method of claim 13, further including forming said reflective particles, including:

providing a substrate having a silicon layer on a silicon oxide layer;

patterning said silicon layer to form isolated regions;

partially removing portions of said silicon oxide layer located between said isolated regions;

forming a reflective coating on one side of said isolated regions;

releasing said isolated regions from said substrate; and attaching one of hydrophobic molecules or hydrophilic molecules to said reflective coating.

\* \* \* \* \*